March 29, 1932.  C. G. BUTLER  1,851,926
LUBRICATING APPARATUS
Filed Jan. 13, 1930   2 Sheets-Sheet 1
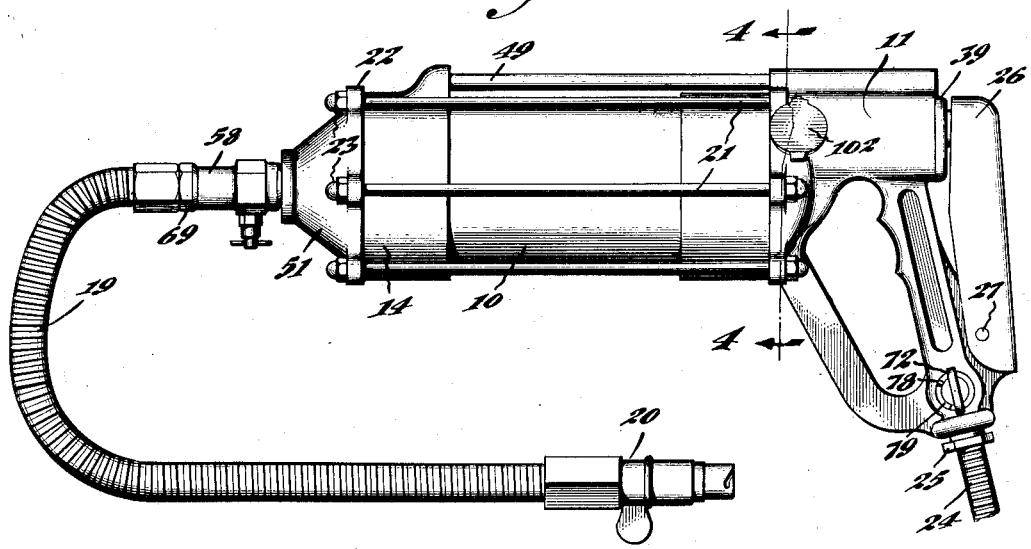
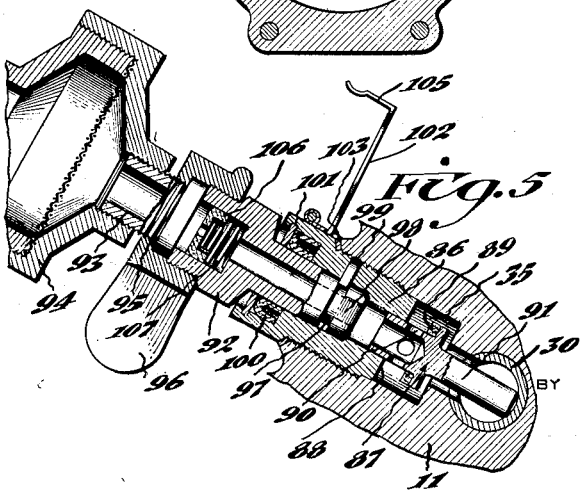
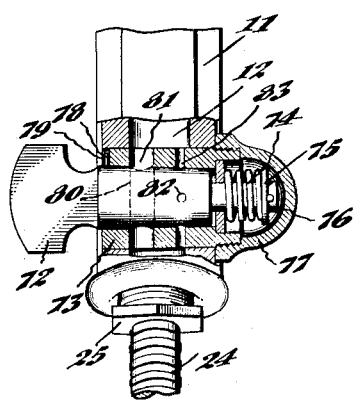
INVENTOR
Clyde G Butler
Wood & Wood ATTORNEYS March 29, 1932.　　C. G. BUTLER　　1,851,926
LUBRICATING APPARATUS
Filed Jan. 13, 1930　　2 Sheets-Sheet 2
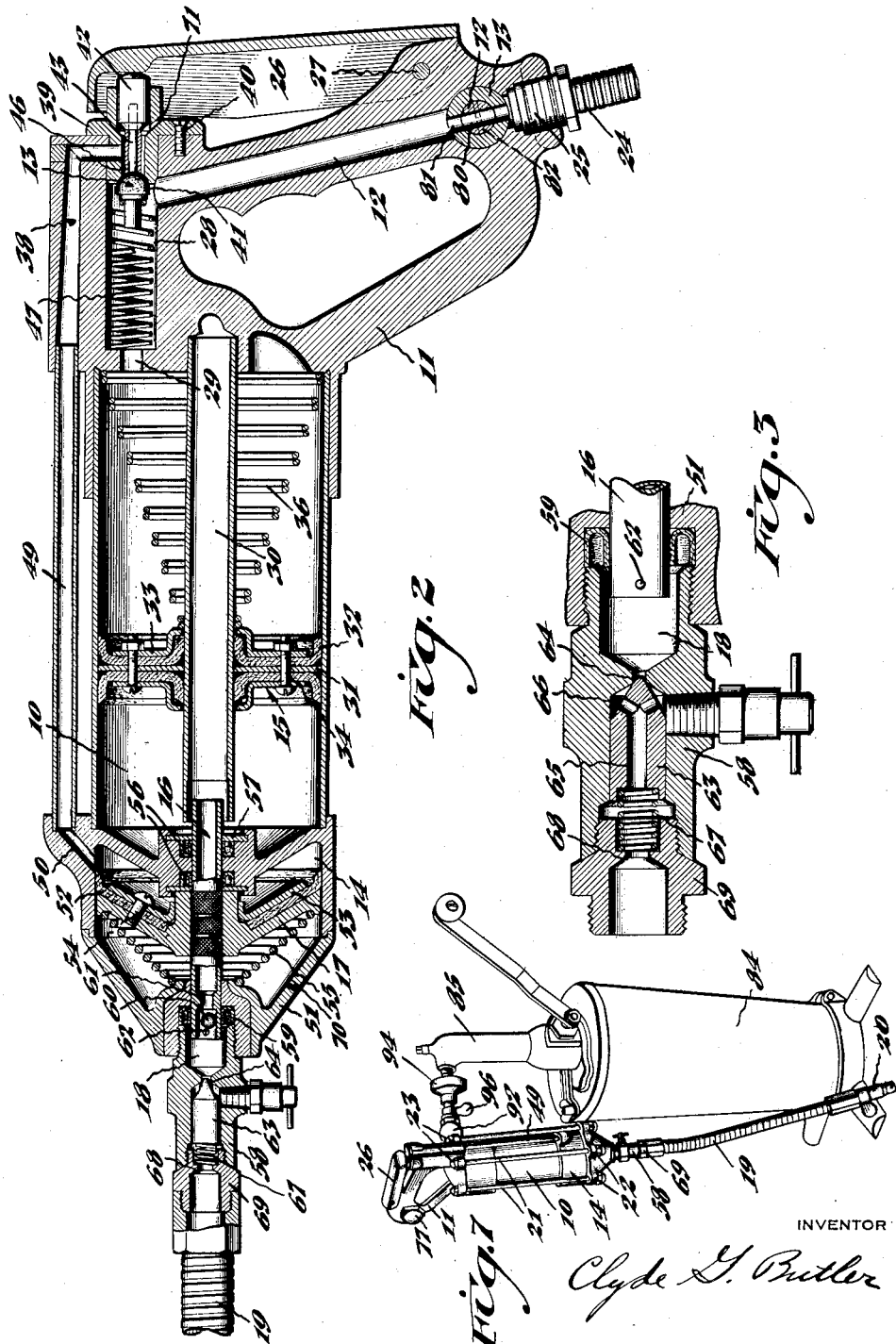
INVENTOR
Clyde G. Butler
BY Wood & Wood
ATTORNEYS Patented Mar. 29, 1932

1,851,926

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

LUBRICATING APPARATUS

Application filed January 13, 1930. Serial No. 420,315.

This invention relates to lubricating apparatus and is particularly directed to a high-pressure lubricating device or gun adaptable for developing extremely high pressure such as six to eight thousand pounds per square inch.

The device herein disclosed is an improvement on the lubricating apparatus described and claimed in the copending application filed by Clyde G. Butler on December 21, 1928, Serial No. 327,677. As also disclosed in the present case and described and claimed in the prior application, the lubricator is adapted to be operated by compressed air. A reservoir is provided in the gun, in which reservoir a follower plate or piston is provided, against one side of which air pressure is continually present and on the other side of which the grease is disposed.

A high-pressure instrumentality is provided at the forward end of the gun which includes a cylinder and piston against which piston the air pressure is introduced. The introduction of air is controlled by means of a throttle valve. The high-pressure air-operated piston moves a hollow plunger piston in communication with the reservoir at one end and moving within a high-pressure chamber at the other end. The high pressure is developed due to the provision of a large area piston moved by air, actuating a small area grease forcing piston.

The grease is supplied to the high-pressure chamber on the back stroke of the piston, appropriate valves being provided to permit inflow of grease into this chamber upon the back stroke and to close the discharge conduit at this time. Upon the forward or power stroke of the piston, these valves are reversed and a quick shot of grease under high pressure is discharged through a grease discharge conduit to the fitting to be lubricated. Filler means are provided which include a valve in the intake operable in conjunction with a grease bucket for forcing grease into the reservoir.

It has been found that there is considerable variation in line pressure back of the follower plate due to the use of a portion of the air supply to operate the high-pressure piston, and due to the tendency of the plate to rebound from the mass of grease as a portion thereof is discharged and the plate moves up. These factors cause a surging of the follower piston within the chamber. The surging action of the follower plate creates a suction on the body of grease within the reservoir, which suction interferes with the packing of grease into the region into which the plunger piston moves for feed into the high-pressure chamber. This creates what may be termed an air pocket at this point. Another difficulty encountered is that slight leakage of air past the piston eventually neutralizes movement of the piston leaving it in perfect balance, between equal air pressures. The gun for either one of these reasons becomes air bound.

It is therefore an object of this invention to provide a differential pressure on the air inlet side of the follower plate which tends to urge the follower plate constantly against the body of grease irrespective of the balancing of pressures at the respective sides of the piston, and to also provide that the follower plate is stabilized and the surging action eliminated.

By means of this differential pressure, the follower plate is continually and positively urged to the discharge end of the reservoir thereby expelling all trapped air and the total capacity of grease and providing that leakage of air past the follower plate does not destroy the functioning of the gun.

Another object is to provide a combined pneumatic and mechanical pressure for actuating the follower plate so that pressure thereon is unfailing and a minimum pressure always is effective to force the grease through the hollow high-pressure piston, past the valves therein, into the high-pressure chamber.

It has also been found that in this combination some difficulty is encountered because of dirt and foreign matter getting under the outlet valve of the high-pressure chamber preventing closing thereof and causing "bleeding" of the gun and loss of grease. Some trouble is also experienced because of disalignment of the valve relative to the seat and irregular wearing of the contacting surfaces.

It is, therefore, another object of this invention to provide an improved valve for the gun which is guidingly mounted so that it will not become disaligned from its seat and in which valve the passageways are so arranged as to cause the passing grease to flush the seat clear of dirt and in which the shape of the valve tip and seat are such as to efficiently dispose of any matter collecting therebetween.

Still another object is to provide an improved filling means and valve for the gun whereby the gun may be quickly and easily connected to a grease bucket in filling operations and whereby a filler plug is locked in the valve opening by insertion and rotation of the plug in the intake opening.

Other objects and certain advantages will be more fully apparent from the description of the drawings, in which:

Figure 1 is a side elevation of the lubricator embodying the present improvements.

Figure 2 is an enlarged longitudinal sectional view of the lubricator illustrating the relation of the elements thereof.

Figure 3 is an enlarged longitudinal sectional view taken through the nose of the gun illustrating the high-pressure chamber and the improved valve therein.

Figure 4 is a sectional view taken on line 4—4, Figure 1, showing the filler valve in closed position.

Figure 5 is a fragmentary sectional view of a portion of Figure 4 slightly enlarged and showing the filler plug of the grease bucket in position within the intake socket of the lubricator with the valve in open position, this view illustrating the filter in the grease bucket discharge line.

Figure 6 is a detailed fragmentary view partly in section illustrating the control valve in the air passageway leading into the gun.

Figure 7 is a general perspective view showing the lubricating gun of the present invention in filling position relative to a grease bucket.

Referring to the drawings, the lubricating apparatus comprises a cylindrical lubricant reservoir 10, a handle 11 supporting the reservoir cylinder, the handle portion containing an air inlet passageway 12 and a throttle valve 13 for controlling the admission of air to a high-pressure air cylinder 14 mounted on the forward end of the reservoir cylinder. The reservoir contains a follower plate 15 against which air is constantly admitted from the air inlet in the handle for urging the follower plate against the grease, and the grease into the region of a high-pressure plunger 16 actuated by means of the piston 17 in the high-pressure air cylinder.

Through the instrumentality of valves, grease is supplied to a high-pressure grease chamber 18 in the nose of the gun and is discharged therefrom through a heavy conduit 19, the end of which conduit is secured to the fitting to be supplied by means of a coupling 20. The coupling forms no part of this invention but is of any type adapted to cooperate with conventional lubricating fittings.

The reservoir cylinder or shell has its ends closed or capped by the handle 11 at one end and the high-pressure air cylinder 14 at the opposite end. The cylinder is socketed into the respective elements mentioned and the elements are drawn down thereon by a series of bolts 21 circumferentially disposed thereabout, traversing flanges 22 in the respective closure means and held therein by means of nuts 23.

Air is supplied to the reservoir cylinder through the handle. A conduit 24 is connected to the butt of the handle by a coupling element 25 screwed into the end of the air passageway 12 extending up into the upper region of the handle. The handle is cut away centrally to permit the insertion of the fingers therethrough so that a convenient grip may be had on the rear portion of the handle and upon a throttle valve trigger 26 pivoted to the butt of the handle as at 27, this throttle valve trigger controlling the flow of air to the high-pressure air cylinder. The air inlet passageway extends to a valve chamber 28 and then through an aperture 29 into the reservoir cylinder in back of the follower plate or piston 15. The passageway from the air conduit through to the reservoir is constantly open. The valve mentioned is toward the rear of the chamber and has no influence on the ingress of air to the lubricant reservoir.

A tube 30 is mounted axially of the reservoir cylinder and the rear end of this tube is secured in the handle element. The follower plate slides upon the tube 30 and on the inner wall of the reservoir cylinder. The follower plate is fabricated of a central disc 31, leather washers 32—32, one on each side of the central washer and flanged both on the inner and outer edges thereof, and clamping discs 33—33, one on each washer, the entire assembly being maintained by means of bolts 34 traversing and drawing the discs and washers together. The tube stops short of the front end of the reservoir so that there is communication between the reservoir and tube.

The reservoir is filled through a valve controlled intake opening 35 extending radially of the handle element and communicating with the rear end of the tube. The forward end of the tube is counterbored to provide sufficient clearance for free movement of the plunger piston 16 which telescopes or backs into this end of the tube.

It is highly essential that grease be constantly supplied to the forward end of the tube and that any voids left by discharge be immediately filled. The grease must be closely and constantly packed to fill the spaces created by discharge and to break up air pockets. Since the air pressure in the reservoir fluctuates due to the usual line pressure variations and due to the fact that the air for the high-pressure piston is supplied from the same passageway, a mechanical means is provided for stabilizing the follower plate, holding it against the grease and maintaining a constant pressure auxiliary to the air pressure. This may be termed a minimum pressure always effective against the plate.

A coil spring 36 of tapered form is placed under compression between the follower plate and the rear wall of the reservoir. The small end of the coil spring is disposed against the follower plate and engages snugly about the axially disposed tube. This spring acts as the means for maintaining a minimum pressure or constant pressure which is auxiliary to the air pressure. Fluctuation of air pressure causes surging of the follower plate which tends to create a suction in the grease resulting in the formation of pockets or voids in the grease and interfering with the proper function of the gun. The spring is, for this reason, effective as a stabilizer for preventing the aforesaid surging.

The spring also functions as a differential in the event of leakage of air past the piston into the grease end of the cylinder. Ordinarily if the pressures on both sides of the follower plate become equal, the plate remains stationary and does not follow up the grease as used. However, in this instance, in the event of equal air pressures, the spring will urge the follower plate constantly against the body of grease and completely empty the reservoir.

Two correspondingly laid and interwoven springs are shown, this being a more advantageous arrangement. The double spring relaxes, in a given range with less variation in the exerted pressure and consequently the feed of the grease is more uniform.

The throttle valve 13 is placed at the mouth of the high-pressure supply passageway 38 leading from the main air passageway in the handle to the high-pressure cylinder, and is mounted in an externally flanged sleeve 39. This sleeve is secured in the rear end of the valve chamber and secured to the handle by means of screws 40 traversing the flange lying against the rear face of the handle. The valve 13 which is slidably mounted in the sleeve is provided with opposing valve surfaces. The forward valve portion 41 is constituted by a semi-sphere of cork or leather. This valve lies against a corresponding surface or seat formed in the sleeve and is connected to a rear valve element 42 by means of a headed stud 43 traversing the forward valve element 41 and screwed into the rear valve element 42 with a spacer sleeve 46 inserted between the valve elements. The rear valve element has a tapered valve surface engaging a correspodingly tapered shoulder in the sleeve. The rear valve element is of extended form and is slidably mounted in the sleeve with its rear end protruding for engagement by the lever or trigger 26.

A coil spring 47 under compression is inserted between the assembled valve, and the forward end of the valve chamber 28, thus maintaining the forward valve element 41 seated when the trigger is not depressed. The passageway 38 for the high-pressure cylinder extends from the bore of the sleeve between the valve seats radially through the sleeve into the handle and turns at right angles in the handle extending toward the front of the gun. A tube 49 connects this passageway with a passageway 50 in the high-pressure cylinder communicating with the rear end of the high-pressure cylinder.

The high-pressure cylinder 14 is provided with a cap 51 secured over the forward end of the cylinder, the draw bolts 21 traversing the flanges 22 of the cap and drawing the cap and cylinder 14 against the end of the reservoir. The high-pressure piston 17 is connected to the hollow plunger 16 centrally thereof and the plunger is slidably mounted in the cylinder and cap. The piston has a cupped leather washer 52 secured to its rear face by means of a disc 53 attached to the piston by screws 54. The piston is of conical form and is inclined from its center toward the rear. A tapered coil spring 55 is placed between the piston and the cap, this spring being suitably seated at its respective ends in annular grooves of the piston and cap, the large end of the spring being disposed against the piston.

The rear end of the hollow plunger piston extends into the reservoir and into the end of the tube as heretofore described. Suitable packing 56 surrounds the plunger for preventing leakage of grease into the air side of the high-pressure cylinder, this packing being secured in place in the wall of the cylinder by means of washers 57.

A small casing 58 containing the high-pressure grease chamber 18 is screwed into the cap against a packing 59 surrounding the forwardly extending end of the plunger piston, which end traverses the high-pressure chamber. There is clearance between the plunger and the walls of the chamber 18 and the packing 59 is U-shaped. The interior of the packing is open to the grease in the chamber 18 via the clearance before mentioned. This causes the inner portion of the packing to engage the plunger under high pressure thereby preventing any leakage along the piston. A ball valve is provided in the forward end of the plunger piston. The ball 60 thereof floats loosely between a shoulder 61 formed in the bore and a pin 62 diametrically disposed at the extreme forward end of the plunger. The shoulder 61 constitutes the seat for the ball when the plunger is active in ejecting the grease on its forward strokes.

As detailed in Figure 3, the nose piece contains a valve 63 for controlling the discharge port of the high-pressure chamber leading to the conduit. This valve is slidably mounted in a chamber beyond the high-pressure chamber and has a conical tip moving against a seat 64 in the port therebetween. The flow of grease is through the center of the valve, the valve being of hollow construction with the exception of the nose. Communication is had to a central bore 65 of the valve by way of substantially radially disposed apertures 66 extending in from the rear portion of the conical tip.

A coil spring 67 under compression bears against the rear end of the valve and is engaged against an inner flange 68 formed in a coupling element 69 screwed into the nose piece beyond the valve chamber. The discharge conduit 19 is suitably connected to this coupling element and includes the conveniently attachable coupling device 20 for securing the discharge end of the hose to the fitting to be lubricated. The forward end of the high-pressure air cylinder is ported as at 70 to permit escape of any air pocketed therein.

The air in the pressure side of the high-pressure cylinder, after the throttle valve is released and the rear valve portion is unseated, escapes through a port 71 extending to the atmosphere from the rear valve seat. It will readily be seen that as the throttle is depressed this exhaust port is cut off since the valve is seated.

As detailed in Figure 6 and Figure 2, a valve 72 is provided in the air supply passageway 12 in the handle. This valve is of plug type, being tapered and drawn into the tapered bore of an inserted sleeve 73 by means of a coil spring 74 compressed between the sleeve 73 and a washer 75 secured on an extending shank 76 of the plug valve. An acorn type cap 77 is screwed on the sleeve and encloses the extending shank and spring of the valve. At the handle end of the valve a pin 78 extends radially from the valve and limits the movement of the valve to 90° due to movement of the pin between the ends of a semicircular groove 79 in the sleeve. When the pin is engaging one end of the groove, a large passageway 80 diametrically arranged in the plug valve is aligned with a large diametrical passageway 81 in the sleeve, this diametric passageway disposed longitudinally of the air passageway. When the pin is at the other end of the groove, a somewhat smaller bore 82 diametrically disposed through the valve at right angles to the first bore 80, is aligned with a diametrically disposed passageway 83 of smaller diameter, in the sleeve and communicating with the air passageway.

The purpose of this valve is to permit a rapid flow of air through the large openings 80 and 81 for a quick shot of grease when the lubricator is being used to lubricate the Alemite or pin type fitting. A quick shot of grease is possible in this instance since the coupling is secured rigidly in place. However, when Zerk type fittings are being lubricated, the smaller openings 82 and 83 are used since a slow pressure must be applied or else the coupling which is manually held against the fitting will be forced away.

As shown in Figure 7, the gun is loaded from a grease bucket 84 by means of a pump 85. Figures 4 and 5 detail the coupling means between the gun and the bucket. A valve supporting socket sleeve 86 is screwed into the radially extending bore communicating with the tube 30, the grease being forced into the gun through this tube. A valve 87 is slidably mounted in this element and is held in place against the abutment 88, formed by the inner end of the sleeve in a bore, by virtue of the pressure of the air and spring against the follower plate in the reservoir acting through the medium of the grease. The valve has an intermediate flange which seats upon a leather washer 89 engaging the end or abutment of the socket. The end of the valve within the sleeve is tubular and the base of the bore thereof is provided with radial apertures 90. The other end of the valve constitutes a shank or stud 91 extending radially into the tube, this stud functioning as a stop element in combination with the inner wall of the tube. As the grease is forced into the tubular end of the valve, the valve is slid outwardly from the bore and the grease forced through the radial openings into the tube, the valve immediately closing when the forcing of the grease ceases.

A plug 92 is atached to the discharge conduit of the grease bucket. This plug is rotatably mounted relative to the conduit. The rotatable connection is to a headed thimble 93 extending from a filter 94 inserted in the conduit. The head end of the thimble abuts an interior flange 95 at one end of the bore of a rotatable handle 96. The other end of the bore is screw-threaded to receive the plug, the plug being screwed in sufficiently to be rigid in position but to leave some clearance for rotation thereof with the handle on the thimble.

The plug is provided with an annular groove 97 toward its outer end and a portion of the plug beyond the groove is flattened at one side as at 98. A lock piece 99 of slightly less thickness than the width of the groove is disposed in the socket tangentially across the side of the bore thereof. The plug is inserted with the flattened portion thereof aligned with the lock piece and after this portion is past the piece, the plug is rotated and it is thereafter impossible to withdraw the same unless returned to the original rotative position of insertion. A packing 100 is secured in a counterbore of the socket, being held in position by means of a washer 101 sprung into place so that there can be no leakage out through the engaging surfaces of the plug and socket.

As shown, closed in Figure 4 and open in Figure 5, a cap 102 is provided for the socket. This cap is hinged to a washer 103 secured between the head of the socket and the body of the gun. An extention 105 of the cap, which extension is sprung outwardly when the cap is closed, frictionally engages the side of the socket head and binds the cap in position. Packing 106 is also provided between the thimble and the plug, this packing being of the cupped washer type urged against the end of the thimble by means of a spring 107 under compression. This cup washer engaging the wall of the plug prevents any leakage from the exterior thereof out through the rotatable connection.

When the reservoir of the gun is empty, the cap covering the intake opening extending into the reservoir is opened and the gun is positioned on the discharge plug or nipple of the grease bucket. This plug or nipple enters into the socket of the gun and past the lock piece, and when the lock piece is disposed in the annular groove, the handle is rotated to move the flattened portion of the plug out of alignment with the lock piece.

It will readily be apparent that this filling device is adaptable for high speed filling of the gun, insertion being quick and the coupling being efficient. As the pump on the top of the grease bucket is operated and the valve within the socket is depressed against the mass of grease which is compacted under spring and air pressure, or spring pressure alone if the air is cut off, the grease will flow through the radial apertures into the axial tube. The effect of loading the gun through the tube is to thoroughly flush the region into which the plunger piston moves and break up any pockets or voids at this point. As the grease is fed into the gun, the follower plate is urged back against the compacting pressure until the chamber is substantially filled. As soon as the pumping action is terminated, the body of grease under the action of the follower plate is active to close the valve immediately, and the gun can then be removed from the nipple and the cap closed.

Having described my invention, I claim:

1. In a device of the class described, a reservoir for grease, a follower plate slidably mounted therein, said reservoir having a discharge passageway at one end, a source of fluid, under variable pressure, connected to the opposite end of the reservoir, and a constant pressure means disposed against the follower plate for co-action with the fluid pressure.

2. In a device of the class described, a cylindrical reservoir for grease, a follower plate disposed therein, said reservoir having a grease discharge passageway extending from one end thereof and an intake for fluid under pressure at the opposite end, a tube axially disposed within the reservoir, said follower plate slidably mounted on said tube, and a tapered coil spring disposed under compression at the fluid side of the chamber between the end wall thereof and the follower plate, the small end of said tapered spring slidably disposed on the axially disposed tube and against the follower plate.

3. In a device of the class described, a reservoir for grease, a follower plate disposed therein, discharge means at one end of said reservoir, a source of fluid under variable pressure connected to the opposite end of the reservoir, and a spring disposed against the follower plate and co-active with the fluid pressure for urging the follower plate against the body of grease.

4. In a high-pressure lubricator, a grease reservoir, means for exerting a constant pressure on the grease in said reservoir, a high-pressure grease chamber, a hollow plunger piston providing a passageway between the reservoir and chamber, a valve at the discharge end of the plunger piston for plugging the head of the plunger on a discharge pumping stroke of the plunger into the grease chamber, means for actuating said plunger piston, a valve controlling the high-pressure discharge from the chamber, said valve having a sliding bearing and a conical tip, a valve seat edge adapted for line contact, said tip formed in the discharge port of the high-pressure chamber, said valve having an internal passageway extending therethrough from beyond the seated portion of the conical end thereof, and means for normally seating the valve.

5. In a high-pressure lubricating gun, a lubricant supply chamber, a high-pressure lubricant chamber, means for feeding the lubricant from the supply chamber to the high-pressure chamber and maintaining a constant pressure thereon, a plunger for traversing said high-pressure chamber to eject the lubricant therefrom, means for operating said plunger, and a slidably mounted valve controlling the discharge of lubricant from the high-pressure chamber, said valve having a conical tip, a valve seat edge adapted for line contact formed at the discharge passageway of the high-pressure chamber for receiving said valve, and said valve having an internal passageway extending therethrough from beyond the seated portion of the conical tip thereof.

6. In a high-pressure lubricator, a high-pressure grease chamber, a plunger piston in said chamber, means for supplying grease to said chamber, means for actuating said plunger piston, a valve controlling the high-pressure discharge from the chamber, said valve having a sliding bearing and a conical tip, a valve seat for said tip formed in the discharge port of the high-pressure chamber, said valve having an internal passageway extending therethrough from beyond the seated portion of the conical end thereof, and means for normally seating the valve.

7. In a device of the class described, a low pressure reservoir for grease, a follower plate slidably disposed within said reservoir, discharge means at the forward end of the reservoir including a high pressure developing device, fluid pressure supply means connected to the rear end of the reservoir and to the high pressure developing device, said supply means constantly connected to the reservoir, means for arbitrarily connecting the supply means to the high pressure developing device, and a constant pressure means disposed against the follower plate for co-action with the fluid pressure in the reservoir.

In witness whereof, I hereunto subscribe my name.

CLYDE G. BUTLER.